Patented May 16, 1933

1,908,935

UNITED STATES PATENT OFFICE

EDUARD TSCHUNKUR, OF COLOGNE-MULHEIM, AND ERNST HERDIECKERHOFF, OF OPLADEN, GERMANY, ASSIGNORS TO I. G. FARBENINDUSTRIE AKTIENGESELL- SCHAFT, OF FRANKFORT-ON-THE-MAIN, GERMANY

PROCESS FOR PREPARING DISULPHIDES

No Drawing. Application filed May 1, 1931, Serial No. 534,448, and in Germany May 9, 1930.

The present invention relates to a process of preparing disulphides from organic compounds containing sulfhydryl groups.

In accordance with the invention organic disulphides are prepared by oxidizing organic compounds containing sulfhydryl groups, more particularly mercaptans of the aromatic- or heterocyclic series or substituted or unsubstituted dithionic- or dithiocarbanic acids, by means of oxygen or gases containing oxygen (air, for example) in the presence of nitrous acid or of oxides of nitrogen, in a neutral or acid medium. The more detailed method of working may be described as follows:—

The compound containing a sulfhydryl group is suspended in water, a water soluble nitrite, such as an alkali metal- or ammonium nitrite, is added and oxygen or a gas containing oxygen (air) is caused to bubble through the reaction mixture. Simultaneously a suitable acid which is able to liberate nitrous acid or nitric oxides from the alkali metal- or ammonium nitrite, is added. The reaction takes place at normal or even lower temperature. High temperatures, for example, temperatures between about 50 and 100° C. are likewise operable.

The quantity of the water soluble nitrite to be added may vary within wide limits mainly depending upon the chemical nature of the compound to be oxidized, the temperature at which the reaction is performed and on the quantity and distribution of the air or oxygen applied. Generally, we prefer to apply the nitrite in an amount between about 5-40% (calculated upon that amount which would be theoretically necessary to oxidize the compound containing sulfhydryl groups to its disulphide in the absence of oxygen).

The type of acid which is operable in our process is dependent on the particular nitrite applied. All those acids will be useful, which are capable of liberating nitrous acid or nitric oxides from the respective nitrite, for example, hydrochloric acid, sulphuric acid, nitric acid, phosphoric acid, formic acid, chloroacetic acid, trichloroacetic acid etc. Advantageously, the acid is added to the reaction mixture in an amount at least sufficient to decompose the nitrite added. Larger amounts are likewise operable and yield better results in some cases. The acid is advantageously slowly added to the reaction mixture. It is a preferred method of working to cause an aqueous solution of the nitrite and the acid, to run slowly into the reaction mixture while gently heating it and blowing a stream of air through the mixture.

Obviously, instead of the free compounds containing sulfhydryl groups, suitable salts thereof, for example, alkali metal- or other water soluble salts of the compounds in question, may be applied, which are then converted into the free sulfhydryl compounds in the reaction mixture by the addition of an acid before or during the oxidation process. This method of working is to be considered an equivalent to the method described before and is of importance in cases in which the free sulfhydryl compounds are unstable.

According to another feature of the invention, the oxidation process is performed by leading nitric oxides and oxygen or gases containing oxygen through the reaction mixture. Also in this case the amount of the nitric oxides may vary within wide limits, the best results being obtained when applying the nitric oxides in an amount between about 5-40% of the amount, which would theoretically be necessary to oxidize the compound containing sulfhydryl groups to its disulphide in the absence of oxygen. Obviously, when working with nitric oxides and when starting with the free sulfhydryl compounds, the addition of an acid is not necessary, but generally we prefer to acidify the reaction mixtures in this case. The other conditions of working are identical to those described for the method of working with water soluble nitrites.

According to our process the reaction products, i. e. the disulphides derived from the corresponding sulfhydryl compounds, are obtained in a very smooth, convenient and cheap manner and in an excellent yield and state of purity. By-products are not formed in substantial amounts. Likewise, the working up of the reaction mixtures, can be performed without any difficulty in the usual manner. It is expressly stated that it is an essential feature of the present invention to perform the oxidation in a neutral or acid medium, and that only in these cases the good results described are obtained.

The following examples illustrate our invention, without, however, restricting it thereto:—

*Example 1*

To a suspension consisting of 100 kgs. of finely powdered 2-mercaptobenzothiazole in 1200 litres of water 15–20 litres of a 30% aqueous sodium nitrite solution (11–14% of the quantity which would be necessary to oxidize the mercaptobenzothiazole by means of the nitrite) are added. Air is then caused to bubble through the reaction mixture while simultaneously dropping in an acid, such as for example, hydrochloric acid or sulphuric acid. The duration of the reaction amounts to about 10–15 hours at room temperature. The yield of dibenzothiazyl-disulphide amounts to over 90% of the theoretical. The process can also be carried out by dissolving a salt of mercaptobenzothiazole in water and oxidizing it by means of air after the addition of the requisite quantity (about 5–15% of theoretical amount) of sodium nitrite and gradually adding hydrochloric acid or sulphuric acid.

The course of the reaction is as follows:

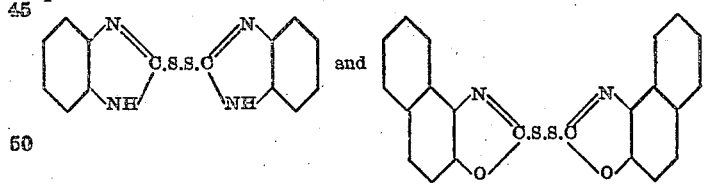

*Example 2*

In the same manner as described in Example 1, 2-mercaptobenzimidazole or 2-mercaptonaphtho-oxazole (obtainable from alpha-nitroso-beta-naphthol) can be easily oxidized to the corresponding disulphides.

The compounds formed most probably possess the formulæ:

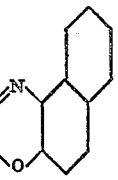

*Example 3*

An aqueous solution of the sodium salt of dimethyldithiocarbamic acid is produced in the known manner from dimethylamine, carbon disulphide and caustic soda solution. To this solution about 10–15% of the theoretical quantity of sodium nitrite is added at room temperature and, during about 15 hours, hydrochloric acid or sulphuric acid is slowly added with continuous blowing in of air.

The resulting tetramethyl-thiuram disulphide precipitates in good yield and satisfactory purity.

It corresponds to the formula:

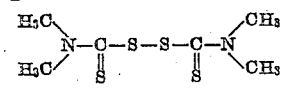

In the above examples, the quantity of the oxygen carrier as well as the temperature of oxidation can be varied within wide limits. The oxidation process can be accelerated or economy can be effected in the quantity of oxygen carrier by working under superatmospheric pressure.

*Example 4*

22 kgs. of finely powdered para-thiocresol (obtainable, for example, by reducing para-toluene sulphonic acid) are pasted with 500 litres of water with the addition of about 2 kgs. of sodium nitrite. The neutral suspension is then treated with air while adding about 35 litres of 1/1 normal hydrochloric acid. The conversion of the starting material into para-para'-ditolyl-disulphide of the formula

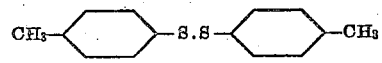

is almost quantitative. By treating para-thiocresol with air without the addition of sodium nitrite under otherwise similar conditions no noteworthy oxidation occurs.

*Example 5*

120 kgs. of potassium xanthogenate are dissolved in 1200 litres of water and mixed with 35 litres of a 20% aqueous sodium nitrite solution. The mixture is slowly acidified at 5–10° C. with 180 kgs. of 18.4% hydrochloric acid and during 15 hours a weak current of air is bubbled through the mixture. The resulting xanthogendisulphide separates and is filtered by suction. The yield amounts to over 90% of the theoretical amount. The xanthogendisulphide is purified by recrystallization from ethyl alcohol. Without the addition of a nitrite no oxidation takes place under the above conditions. The xanthogendisulphide most probably corresponds to the formula:

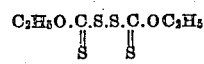

We claim:—
1. The process which comprises oxidizing in an aqueous non-alkaline medium a sulfhydryl compound of the group consisting of the mercaptans of the aromatic and heterocyclic series, dithionic- and dithiocarbamic acids, with oxygen in the presence of a compound of the group consisting of nitrous acid and nitric oxides.

2. The process which comprises oxidizing in an aqueous non-alkaline medium a sulfhydryl compound of the group consisting of the mercaptans of the aromatic and heterocyclic series, dithionic- and dithiocarbamic acids, with oxygen in the presence of a compound of the group consisting of nitrous acid and nitric oxides in an amount corresponding to about 5–40% of that amount which would be theoretically necessary to oxidize the sulfhydryl compound to its disulphide in the absence of oxygen, and at a temperature between room temperature and about 100° C.

3. The process which comprises suspending in water a sulfhydryl compound of the group consisting of the mercaptans of the aromatic and heterocyclic series, dithionic- and dithiocarbamic acids, and oxidizing the sulfhydryl compound by introducing into the suspension oxygen in the presence of a water soluble nitrite and of an acid which is capable of decomposing the nitrite to nitrous acid and nitric oxides, the acid being applied in an amount at least sufficient to decompose the nitrite present.

4. The process which comprises suspending in water a sulfhydryl compound of the group consisting of the mercaptans of the aromatic and heterocyclic series, dithionic- and dithiocarbamic acids, and oxidizing the sulfhydryl compound by introducing into the suspension oxygen at a temperature between room temperature and about 100° C. in the presence of a water soluble nitrite in an amount corresponding to about 5–40% of that amount which would be necessary to oxidize the sulfhydryl compound to its disulphide in the absence of oxygen, and in the presence of an acid which is capable of decomposing the nitrite to nitrous acid and nitric oxides, the acid being applied in an amount at least sufficient to decompose the nitrite present.

5. The process which comprises suspending in water a sulfhydryl compound of the group consisting of the mercaptans of the aromatic and heterocyclic series, dithionic- and dithiocarbamic acids, and oxidizing the sulfhydryl compound by passing a current of air through the suspension at a temperature between room temperature and about 100° C. in the presence of an alkali metal- or ammonium nitrite in an amount corresponding to about 5–40% of that amount, which would be necessary to oxidize the sulfhydryl compound to its disulphide in the absence of oxygen, and in the presence of an acid of the group consisting of sulphuric acid and hydrochloric acid, the acid being applied in an amount at least sufficient to decompose the nitrite present.

6. The process which comprises suspending 2-mercaptobenzimidazole in water and passing a current of air through the suspension at about room temperature in the presence of an alkali metal- or ammonium nitrite in an amount corresponding to about 5–40% of that amount, which would be necessary to oxidize the mercaptobenzimidazole to its disulphide in the absence of oxygen, and in the presence of an acid of the group consisting of sulphuric acid and hydrochloric acid, the acid being applied in an amount at least sufficient to decompose the nitrite present.

In testimony whereof, we affix our signatures.

EDUARD TSCHUNKUR.
ERNST HERDIECKERHOFF.